(12) United States Patent
Sun et al.

(10) Patent No.: US 10,351,115 B1
(45) Date of Patent: Jul. 16, 2019

(54) AIR BRAKE RELAY VALVE

(71) Applicant: Automotive Research & Testing Center, Lugong (TW)

(72) Inventors: Fu-Hsien Sun, Lugong (TW); Chien-An Chen, Lugong (TW); Ming-Jyun Lin, Lugong (TW)

(73) Assignee: Automotive Research & Testing Center, Lugong (TW)

( * ) Notice: Subject to any disclaimer, the term of this patent is extended or adjusted under 35 U.S.C. 154(b) by 71 days.

(21) Appl. No.: 15/855,565

(22) Filed: Dec. 27, 2017

(51) Int. Cl.
| | | |
|---|---|---|
| *B60T 15/18* | (2006.01) | |
| *B60T 11/28* | (2006.01) | |
| *F16K 31/126* | (2006.01) | |
| *F16K 31/04* | (2006.01) | |
| *F16K 7/12* | (2006.01) | |
| *B60T 13/26* | (2006.01) | |

(52) U.S. Cl.
CPC ............ *B60T 11/28* (2013.01); *F16K 31/047* (2013.01); *F16K 31/126* (2013.01); *B60T 13/26* (2013.01); *F16K 7/12* (2013.01)

(58) Field of Classification Search
CPC .......... B60T 11/28; B60T 15/18; B60T 15/20; B60T 13/26; F16K 31/047; F16K 31/126
See application file for complete search history.

(56) References Cited

U.S. PATENT DOCUMENTS

| | | | | |
|---|---|---|---|---|
| 3,399,933 A | * | 9/1968 | Alfieri ..................... | B60T 15/18 137/627.5 |
| 4,125,290 A | * | 11/1978 | Reinecke .............. | B60T 8/1825 303/22.1 |
| 4,640,556 A | * | 2/1987 | Fauck ................... | B60T 8/1881 303/22.1 |
| 7,577,509 B2 | | 8/2009 | Goebels et al. | |
| 2015/0239441 A1 | | 8/2015 | Klostermann et al. | |

* cited by examiner

*Primary Examiner* — Xuan Lan Nguyen
(74) *Attorney, Agent, or Firm* — Brinks Gilson & Lione (57) ABSTRACT

An air brake relay valve includes an air guide unit having a movable set, a drive unit having a motor and a worm shaft, and a cam unit having a transmission member and a driven member. During a brake action, the motor rotates the worm shaft to rotate the transmission member so as to push the driven member downward to thereby move the movable set to a communicating position where a first valve opening and a second valve opening fluidly communicate with each other. When the brake action is released, the motor rotates reversely so that the driven member is moved upward and that the movable set moves, without being applied with additional force, to a non-communicating position where the first and second valve openings do not fluidly communicate.

6 Claims, 11 Drawing Sheets

AIR BRAKE RELAY VALVE

FIELD

The disclosure relates to a brake mechanism, and more particularly to an air brake relay valve.

BACKGROUND

Figure 1:
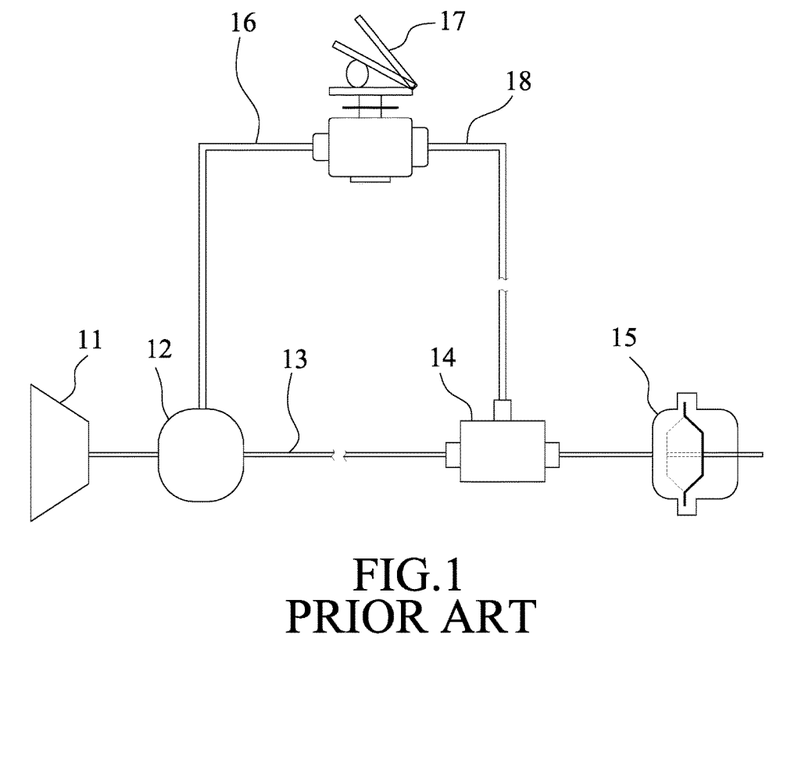
FIG. 1 is a schematic view of a conventional vehicle brake system.

Referring to FIG. 1, a conventional vehicle brake system includes an air compressor 11, an air reservoir 12 receiving pressurized air (i.e., pressurized fluid) from the air compressor 11, a conduct line 13 connected to the air reservoir 12 and a relay valve 14, a plurality of actuators 15 (only one is shown in the figure) connected to the relay valve 14, a first brake line 16 connected to the air reservoir 12 and a brake pedal 17, and a second brake line 18 connected to the brake pedal 17 and the relay valve 14.

In a normal driving situation, the pressurized air is delivered from the air reservoir 12 to the relay valve 14 and the brake pedal 17 through the conduct line 13 and the first brake line 16, respectively. At this time, the pressurized air is not delivered between the brake pedal 17 and the relay valve 14, thus the actuators 15 are not actuated and a brake action is not generated.

When a vehicle operator steps on the brake pedal 17, the pressurized air is delivered to the relay valve 14 through the second brake line 18 to thereby permit the pressurized air in the conduct line 13 to flow to the actuators 15 for generating a brake action.

However, for generating a brake action in rear wheels of a long vehicle, such as a bus, the second brake line 18 has to be relatively long for proper operation of the relay valve 14, which leads to a long response time and results in a time delay of the brake action. In addition, the amount of the pressurized air flowing from the conduct line 13 to the actuators 15 depends on an extent of coverage of an opening (not shown) of the relay valve 14, which is determined by the amount of the pressurized air flowing into the relay valve 14 from the second brake line 18. The control of the pressurized air flow in the relay valve 14 involves multiple parameters that have a non-linear relationship. Therefore, the control of the extent of coverage of the opening of the relay valve 14 is relatively complex, and a desirable level of control precision is not achieved, so there is room for improving the relay valve 14.

A conventional relay valve, as disclosed in U.S. Pat. No. 7,577,509, is designed such that flowing of pressurized air from an air reservoir to an antilock braking system is controlled by the amount of pressurized air flow through a solenoid controlled valve. However, an extent of coverage of an opening (not shown) of the conventional relay valve is also controlled by pneumatic pressure (i.e., the pressurized air flow), and thus such conventional relay valve has the same drawbacks and the same control precision issue as previously mentioned.

SUMMARY

Therefore, an object of the disclosure is to provide an air brake relay valve that can alleviate at least one of the drawbacks of the prior arts.

According to the disclosure, the air brake relay valve includes a top housing unit, a bottom housing unit, an air guide unit, a drive unit, and a cam unit.

The top housing unit defines an upper accommodating space and a lower accommodating space that are spaced apart along a first axis which extends in an up-down direction.

The bottom housing unit defines an operating space that opens upward, and an air guiding space that opens toward the lower accommodating space and that fluidly communicates with the operating space. The bottom housing unit is formed with a first valve opening that fluidly communicates with the operating space and that is adapted to be connected to a pressure supply, and at least one second valve opening that fluidly communicates with the air guiding space and that is adapted to be connected to at least one brake chamber.

The air guide unit includes a base seat, a ring plate member, a movable set, and a first resilient member. The base seat is disposed in the operating space, and has a base portion and a protruding portion protruding upward from the base portion. The ring plate member is disposed in the operating space above the base seat and is formed with an extension hole. The movable set is disposed on the base seat, is movable along the first axis, and has an extension portion having an outer contour smaller than the extension hole for insertion into the extension hole, and a seal portion connected to a bottom end of the extension portion, sleeved on the protruding portion of the base seat, and having an outer contour larger than the extension hole. The first resilient member is connected between the base portion of the base seat and the seal portion of the movable set so as to bias the seal portion away from the base portion.

The movable set is movable between a communicating position, where the movable set is pushed so that the seal portion of the movable set is spaced apart from the ring plate member against a biasing force of the first resilient member, and so that a portion of the operating space which is adjacent to the first valve opening fluidly communicates with another portion of the operating space which is adjacent to the air guiding space through the extension hole to thereby permit fluid communication between the first and second valve openings, and a non-communicating position, where the movable set is biased by the first resilient member so that the seal portion sealingly contacts the ring plate member and cooperates with the extension portion to sealingly cover the extension hole, and so that the portion of the operating space which is adjacent to the first valve opening is isolated from the another portion of the operating space which is adjacent to the air guiding space to thereby prevent fluid communication between the first and second valve openings.

The drive unit includes a worm shaft that extends along a second axis transverse to the up-down direction and that extends into the upper accommodating space, and a motor that is for driving the worm shaft to rotate about the second axis.

The cam unit includes a transmission member, a driven member, and a second resilient member. The transmission member has a worm gear portion meshing with the worm shaft and driven by the worm shaft to rotate about a third axis which is transverse to the first and second axes, and a cam portion co-rotatable with the worm gear portion. The driven member is movable along the first axis, has a cam follower portion disposed under and in contact with the cam portion of the transmission member, and a stem portion extending downward from the cam follower portion toward the extension portion of the movable set. The second resilient member is disposed on the driven member to bias the cam follower portion toward the transmission member.

During a brake action, the motor rotates by a predetermined angle to rotate the worm shaft to drive rotation of the transmission member, so that the cam portion of the transmission member is rotated to push the driven member downward to thereby push the movable set to move to the communicating position.

When the brake action is released, the motor rotates reversely by the predetermined angle to move the cam portion of the transmission member away from the driven member, so that the driven member is moved upward by a biasing force of the second resilient member away from the movable set and that the movable set returns to the non-communicating position without being applied with additional force.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 2:
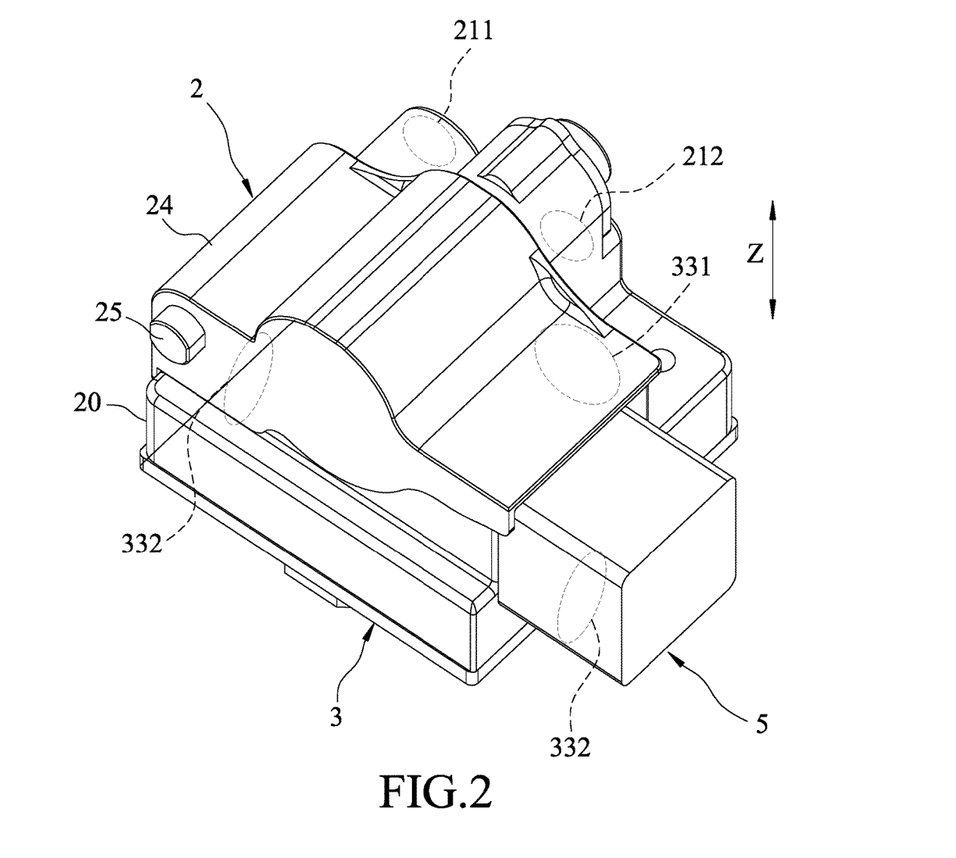
FIG. 2 is an assembled perspective view illustrating an embodiment of an air brake relay valve according to the disclosure.
Figure 3:
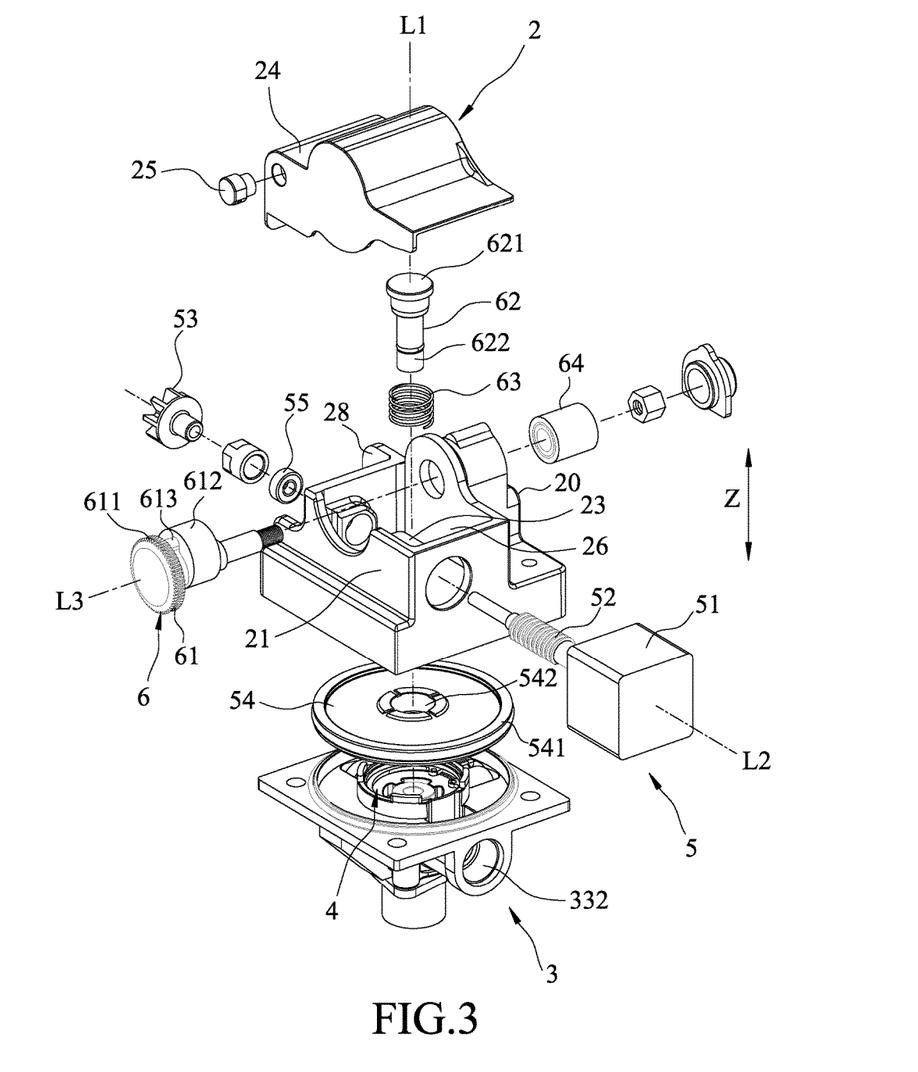
FIG. 3 is an exploded perspective view of the embodiment.
Figure 4:
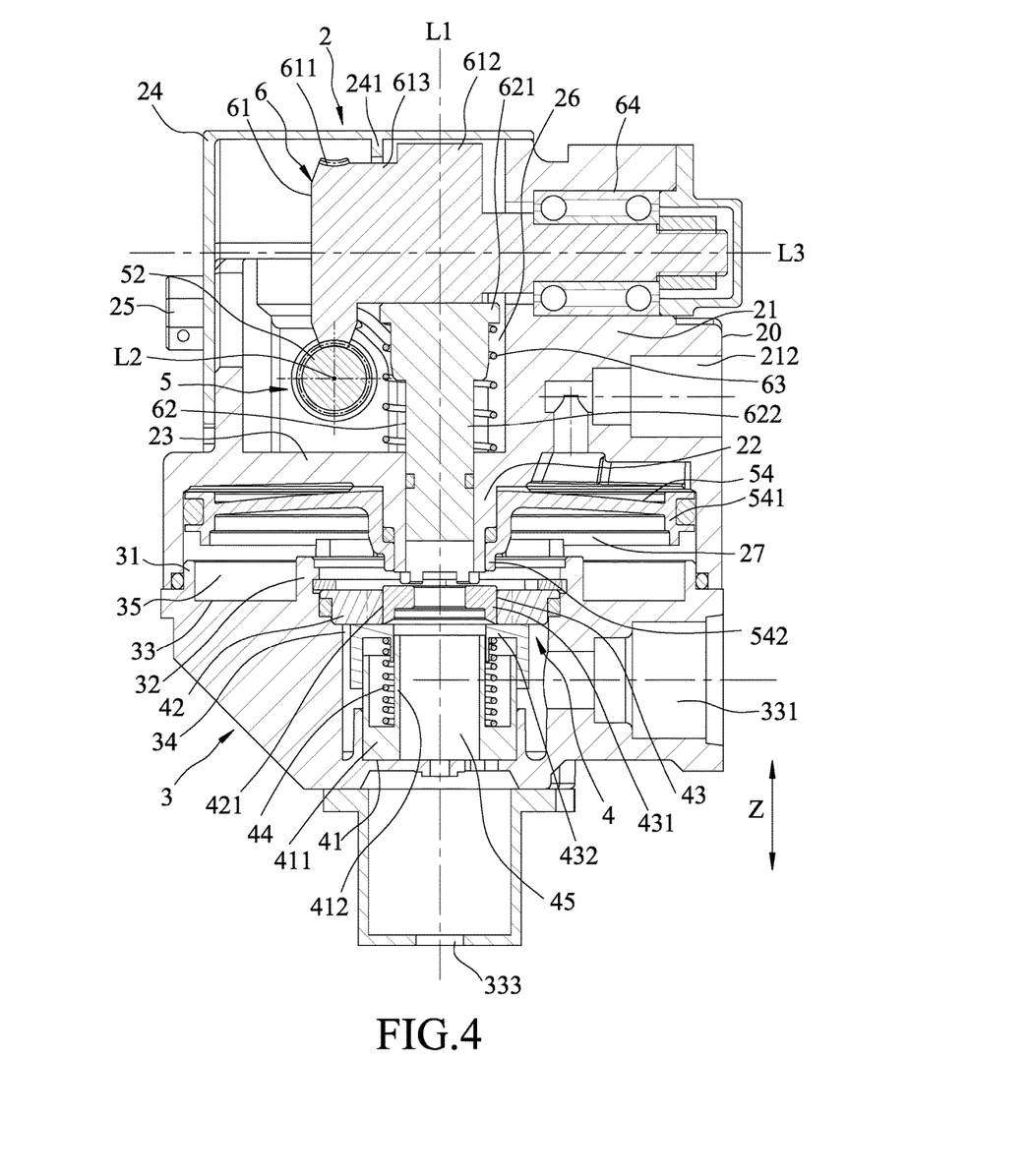
FIG. 4 is a sectional view of the embodiment, illustrating a movable set of the air brake relay valve at a non-communicating position.

Referring to FIGS. 2 to 4, an embodiment of an air brake relay valve according to the disclosure includes a top housing unit 2, a bottom housing unit 3, an air guide unit 4, a drive unit 5, and a cam unit 6.

Figure 5:
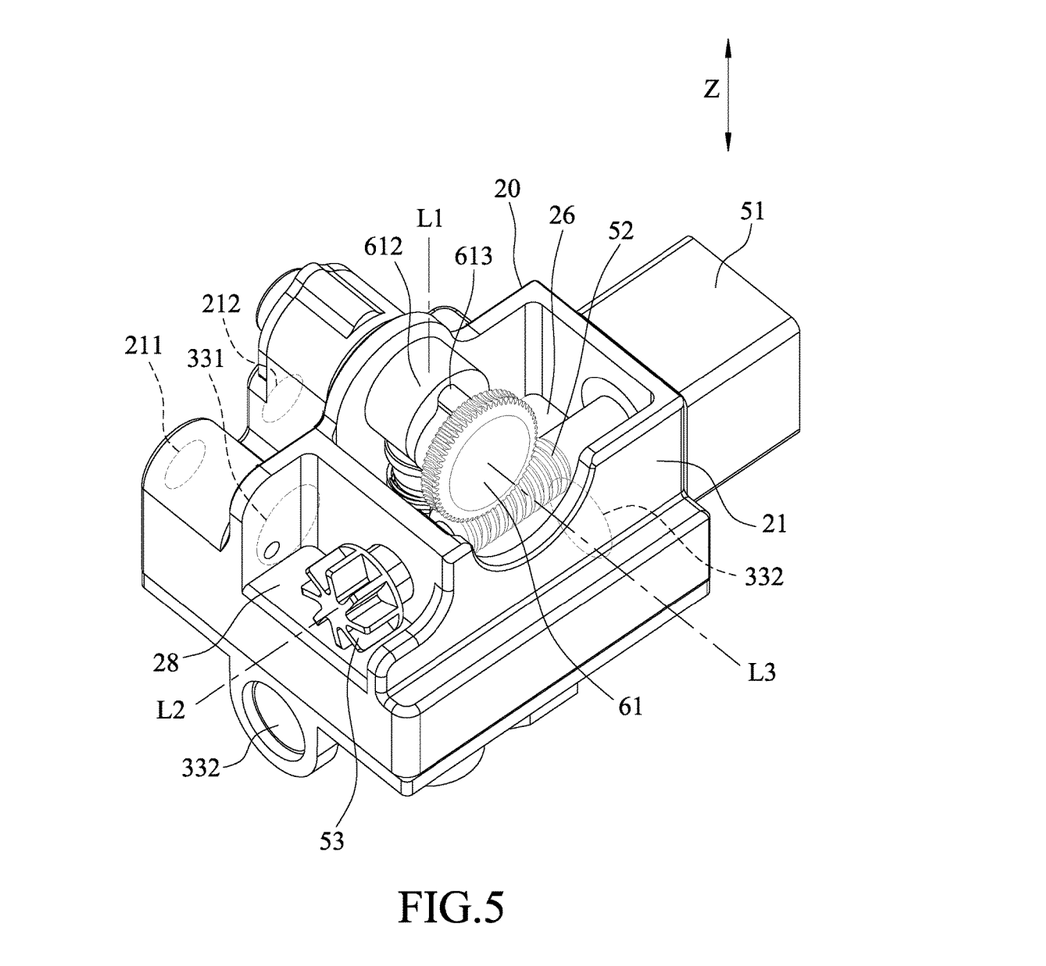
FIG. 5 is a fragmentary assembled perspective view of the embodiment with a cover of the air brake relay valve being removed.

Referring to FIGS. 3 to 5, the top housing unit 2 includes a top seat 20, a cover 24, and a plug member 25. The top seat 20 includes a top surrounding wall 21 that surrounds a first axis (L1) which extends in an up-down direction (Z), a tubular wall 22 that surrounds the first axis (L1) and that is surrounded by the top surrounding wall 21, and a top connecting wall 23 that interconnects the top surrounding wall 21 and the tubular wall 22.

Figure 6:
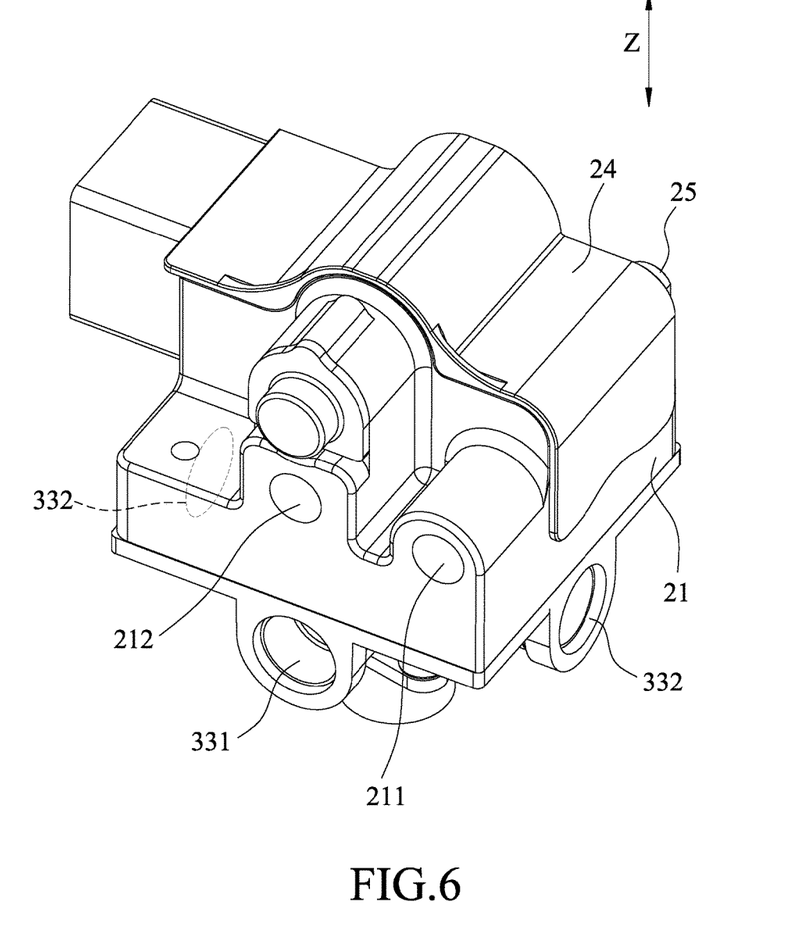
FIG. 6 is an assembled perspective view of the embodiment from another angle.

Referring to FIGS. 4 to 6, the top surrounding wall 21, the tubular wall 22, and the top connecting wall 23 cooperatively define an upper accommodating space 26 and a lower accommodating space 27 that are spaced apart in the up-down direction (Z) (i.e., spaced apart along the first axis (L1)). The top surrounding wall 21 and the top connecting wall 23 cooperatively define a separated space 28 that is spaced apart from the upper accommodating space 26 along a second axis (L2) which is transverse to the first axis (L1) (i.e., transverse to the up-down direction (Z)). The top surrounding wall 21 is formed with a fifth valve opening 211 that fluidly communicates with the separated space 28, and a fourth valve opening 212 that fluidly communicates with the lower accommodating space 27.

The cover 24 is disposed on the top surrounding wall 21 to cover the upper accommodating space 26 and the separated space 28, and is provided with an abutment piece 241 that protrudes downward from the cover 24. The plug member 25 removably plugs into a part of the cover 24 which corresponds in position to the separated space 28.

Figure 7:
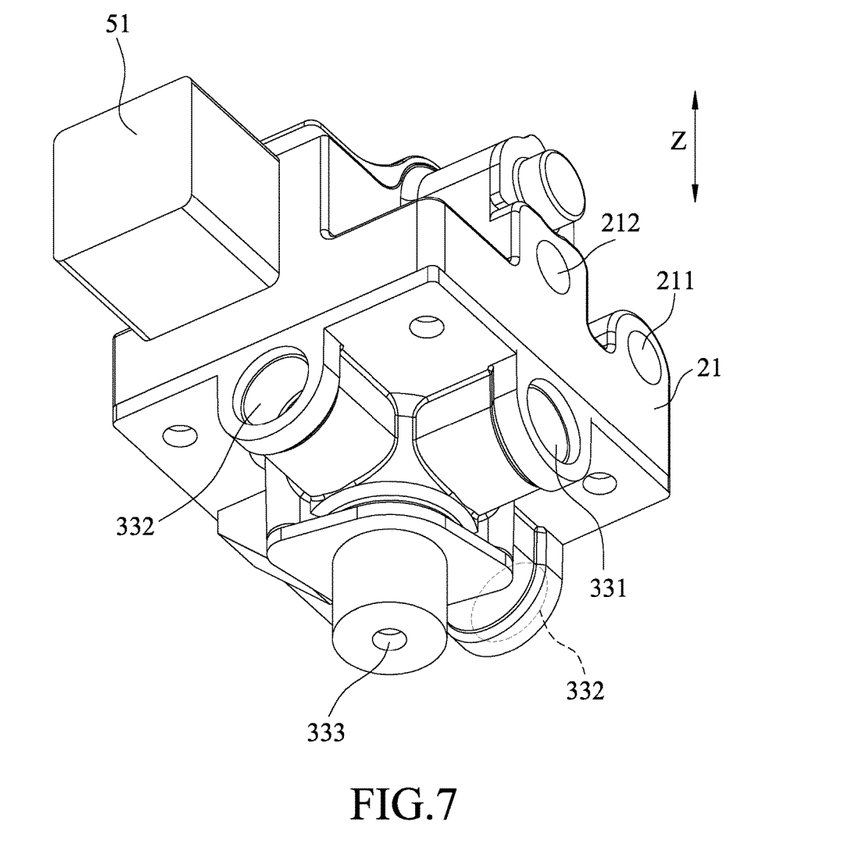
FIG. 7 is another assembled perspective view of the embodiment from a different angle.
Figure 8:
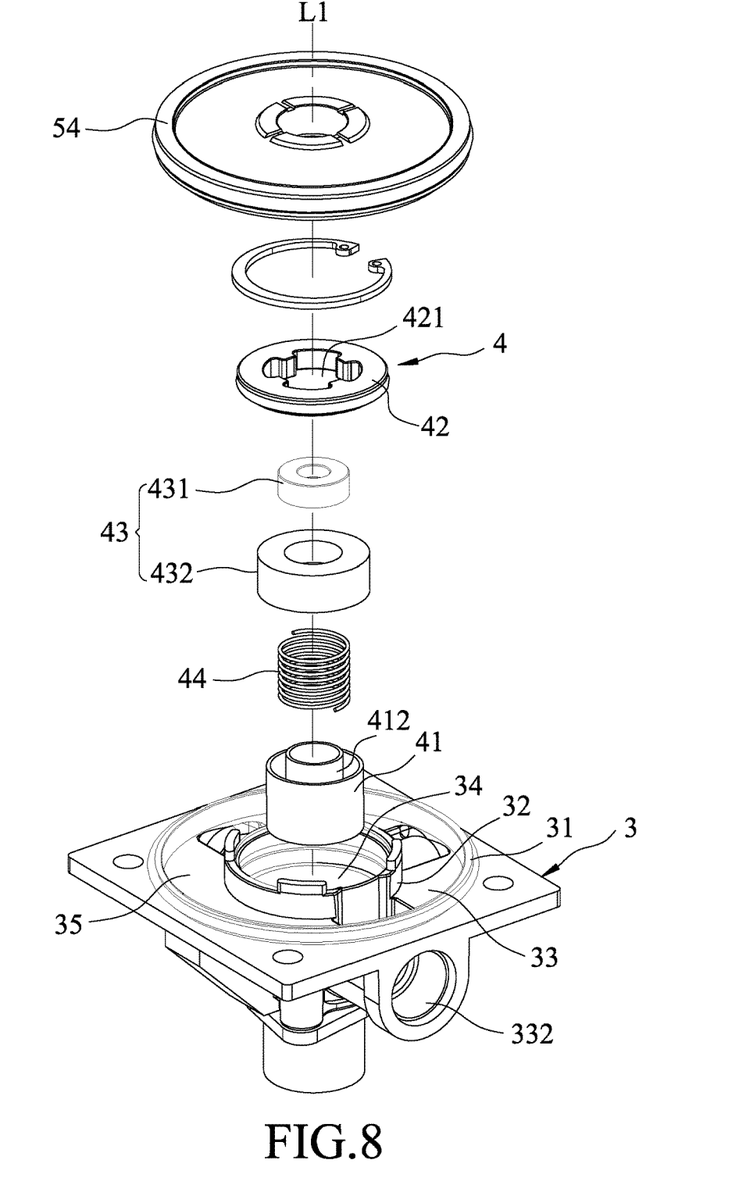
FIG. 8 is an exploded perspective view of a diaphragm, an air guide unit, and a bottom housing unit of the air brake relay valve.

Referring to FIGS. 4, 7, and 8, the bottom housing unit 3 includes a bottom surrounding wall 31 that is located under the top surrounding wall 21, an inner surrounding wall 32 that is surrounded by the bottom surrounding wall 31, and a bottom connecting wall 33 that interconnects the bottom surrounding wall 31 and the inner surrounding wall 32.

The inner surrounding wall 32 defines an operating space 34 that opens upward. The bottom surrounding wall 31, the inner surrounding wall 32, and the bottom connecting wall 33 cooperatively define an air guiding space 35 that opens upward toward the lower accommodating space 27 and that fluidly communicates with the operating space 34.

The bottom connecting wall 33 is formed with a first valve opening 331 that fluidly communicates with the operating space 34, two second valve openings 332 that fluidly communicate with the air guiding space 35, and a third valve opening 333 that fluidly communicates with the operating space 34. In this embodiment, the number of the second valve openings 332 is exemplified to be two, but may be one or more than two depending on actual design requirements.

The air guide unit 4 includes a base seat 41, a ring plate member 42, a movable set 43, and a first resilient member 44. The base seat 41 is disposed in the operating space 34, and has a substantially hollow cylindrical base portion 411 and a protruding portion 412 protruding upward from an inner bottom periphery of the base portion 411. The ring plate member 42 is disposed in the operating space 34 above the base seat 41 and is formed with an extension hole 421. The movable set 43 is disposed on the base seat 41, is movable along the first axis (L1), and has an extension portion 431 having an outer contour smaller than the extension hole 421 for insertion into the extension hole 421, and a seal portion 432 connected to a bottom end of the extension portion 431, sleeved on the protruding portion 412 of the base seat 41, and having an outer contour larger than the extension hole 421. In this embodiment, the extension portion 431 and the seal portion 432 of the movable set 43 are separate and discrete elements, but may be formed as one piece in a modification of the embodiment.

The first resilient member 44 is connected between the base portion 411 of the base seat 41 and the seal portion 432 of the movable set 43 so as to bias the seal portion 432 away from the base portion 411. In this embodiment, the first resilient member 44 is a compression spring.

The protruding portion 412 of the base seat 41 cooperates with the extension portion 431 and the seal portion 432 of the movable set 43 to define an exhaust channel 45 that fluidly communicates with the third valve opening 333.

Figure 9:
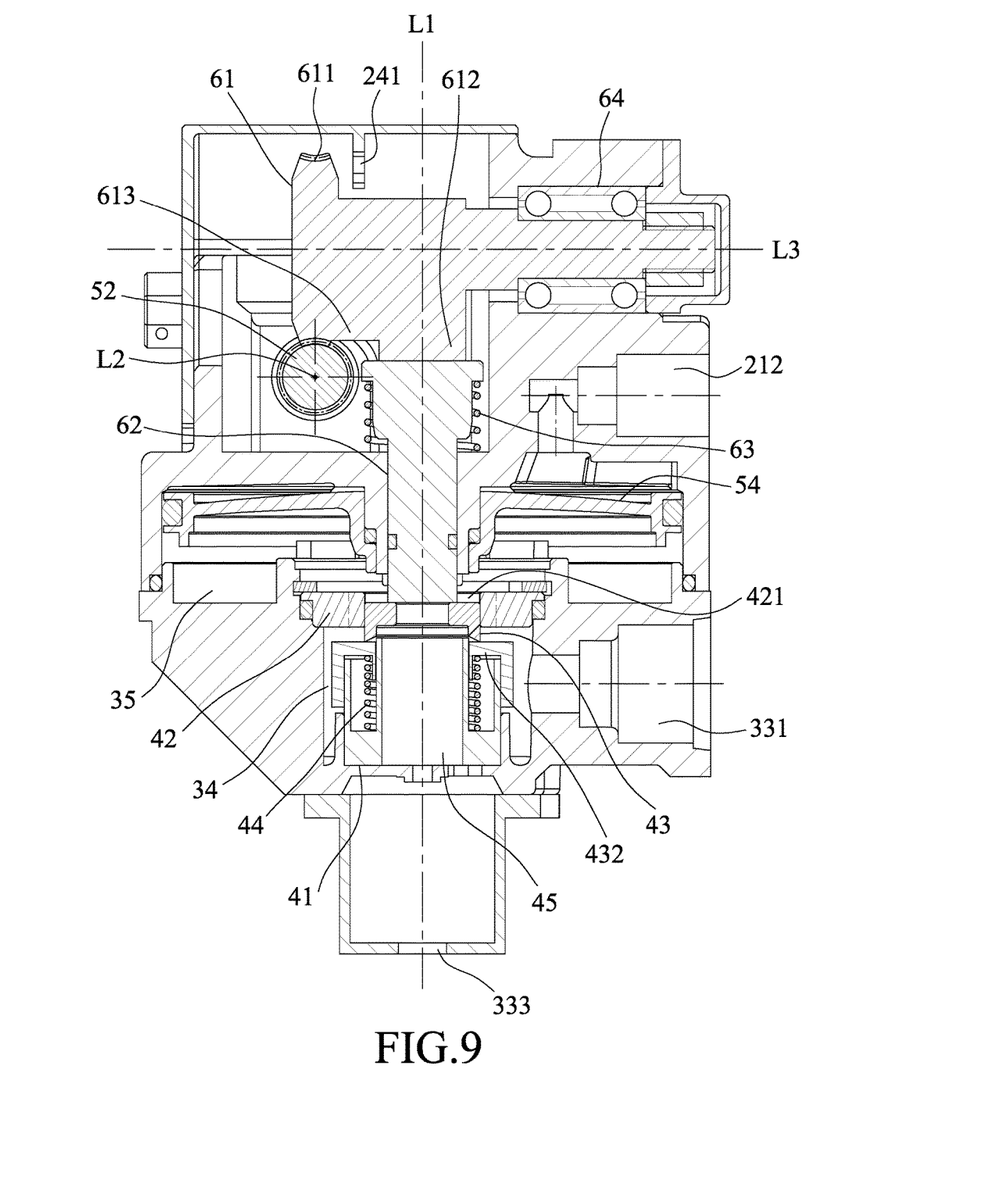
FIG. 9 is a view similar to FIG. 4, but illustrating the movable set at a communicating position.

Referring to FIGS. 4, 8, and 9, the movable set 43 is movable between a communicating position (see FIG. 9) and a non-communicating position (see FIG. 4). At the communicating position, the movable set 43 is pushed downward so that the seal portion 432 of the movable set 43 is spaced apart from the ring plate member 42 against a biasing force of the first resilient member 44, and so that a portion of the operating space 34 which is adjacent to the first valve opening 331 fluidly communicates with another portion of the operating space 34 which is adjacent to the air guiding space 35 through the extension hole 421 to thereby permit fluid communication between the first and second valve openings 331, 332. At the non-communicating position, the movable set 43 is biased by the first resilient member 44 to move upward so that the seal portion 432 sealingly contacts the ring plate member 42 and cooperates with the extension portion 431 to sealingly cover the extension hole 421, and so that the portion of the operating space 34 which is adjacent to the first valve opening 331 is isolated from the another portion of the operating space 34 which is adjacent to the air guiding space 35 to thereby prevent fluid communication between the first and second valve openings 331, 332.

Referring to FIGS. 3 to 5, the drive unit 5 includes a worm shaft 52 that extends along the second axis (L2) and that extends into the upper accommodating space 26 and the separated space 28, a motor 51 that is disposed on the top surrounding wall 21 and that is for driving the worm shaft 52 to rotate about the second axis (L2), a blade set 53 that is disposed in the separated space 28 at a position laterally of and corresponding to the fifth valve opening 211 and that is co-rotatably coupled to the worm shaft 52, a diaphragm 54 that is disposed in the lower accommodating space 27 and that is sleeved on the tubular wall 22 and connected to the top surrounding wall 21, and a bearing 55 that is disposed between the top surrounding wall 21 and the worm shaft 52.

The diaphragm 54 has an outer fixed portion 541 connected to an inner periphery of the top surrounding wall 21, and an inner push portion 542 that is slidable along the tubular wall 22, and that is operable to push the movable set 43 downward so as to move the movable set 43 to the communicating position.

The cam unit 6 includes a transmission member 61, a driven member 62, a second resilient member 63, and a bearing 64. The transmission member 61 has a worm gear portion 611 meshing with the worm shaft 52 and driven by the worm shaft 52 to rotate about a third axis (L3) which is transverse to the first and second axes (L1, L2), a cam portion 612 co-rotatable with the worm gear portion 611, and an abutment portion 613 disposed between the worm gear portion 611 and the cam portion 612, projecting in a radial direction, and corresponding in position to the abutment piece 241. The driven member 62 is movable along the first axis (L1), and has a cam follower portion 621 disposed under and in contact with the cam portion 612 of the transmission member 61, and a stem portion 622 extending downward from the cam follower portion 621 toward the extension portion 431 of the movable set 43 for pushing the extension portion 431 downward, and extending movably into the tubular wall 22. The second resilient member 63 is disposed on the driven member 62, and has two ends respectively urge against the cam follower portion 621 of the driven member 62 and the top surrounding wall 21 so as to bias the cam follower portion 621 away from the top surrounding wall 21 toward the transmission member 61.

Figure 10:
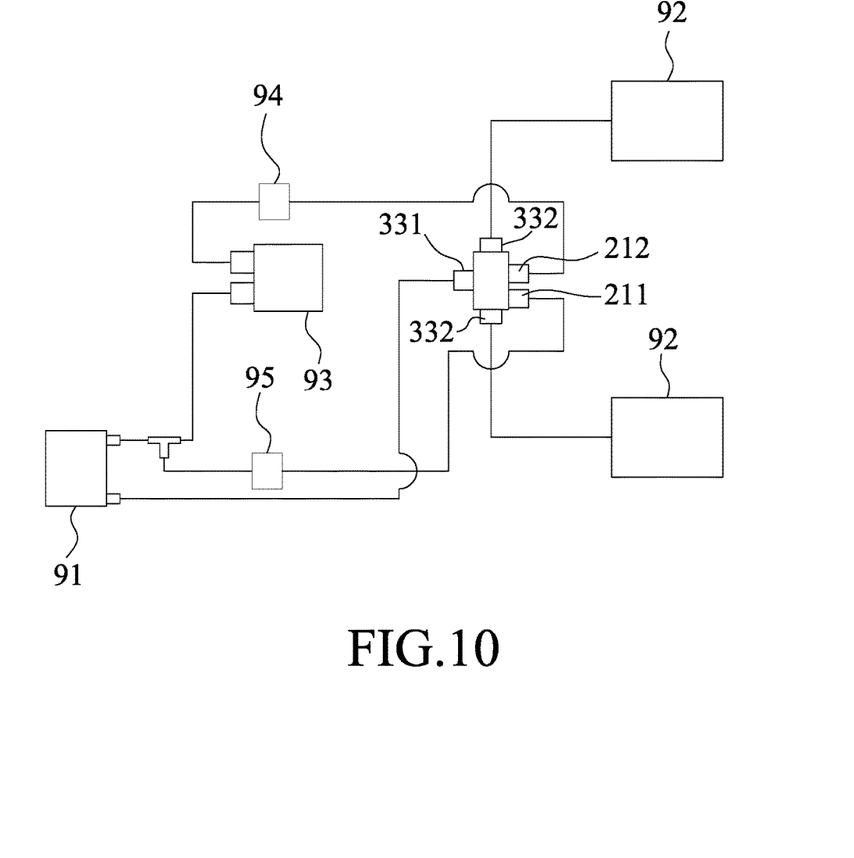
FIG. 10 is a schematic view illustrating operation of the embodiment in a vehicle brake system.

Referring to FIGS. 3, 4, and 10, when the air brake relay valve is used in a vehicle brake system, the first valve opening 331 is connected to a pressurized air supply 91, the second valve openings 332 are respectively connected to two brake chambers 92, the fourth valve opening 212 is connected to the pressurized air supply 91 with a brake pedal 93 and a normally open solenoid valve 94 disposed therebetween, and the fifth valve opening 211 is connected to the pressurized air supply 91 with a normally close solenoid valve 95 disposed therebetween. When the movable set 43 is at the non-communicating position, the first and second valve openings 331, 332 do not fluidly communicate with each other, thus pressurized air from the pressurized air supply 91 cannot be delivered to the brake chambers 92 to generate a brake action.

Referring to FIGS. 7, 9, and 10, when a vehicle operator steps on the brake pedal 93 to generate a brake action, the motor 51 is driven to rotate by a predetermined angle via a control unit (not shown) to rotate the worm shaft 52 so as to drive rotation of the transmission member 61 and so as to move the abutment portion 613 of the transmission member 61 away from the abutment piece 241. In this way, the cam portion 612 of the transmission member 61 is rotated to push the driven member 62 downward to thereby push the movable set 43 to move to the communicating position. At this time, the exhaust channel 45 has a top open end sealingly covered by the stem portion 622 of the driven member 62, and the first and second valve openings 331, 332 fluidly communicates with each other so that the pressurized air from the pressurized air supply 91 can be delivered to the brake chambers 92 to generate a brake action via a brake mechanism (not shown).

Referring to FIGS. 4, 7, and 10, when the brake action is released (i.e., the brake pedal 93 is released from being stepped on), the motor 51 rotates reversely by the predetermined angle via the control unit to move the cam portion 612 of the transmission member 61 upward and away from the driven member 62, and to move the abutment portion 613 of the transmission member 61 toward the abutment piece 241, so that the driven member 62 is moved upward by a biasing force of the second resilient member 63 away from the movable set 43 and that the movable set 43 returns to the non-communicating position without being applied with additional force. At this time, the exhaust channel 45 is no longer covered by the stem portion 622 of the driven member 62 to thereby permit an excess of the pressurized air to flow therethrough and be discharged out of the third valve opening 333.

Since the movable set 43 is moved by direct pushing of the driven member 62, and since the driven member 62 is driven to move by the motor 51 through the transmission member 61, the worm shaft 52 and the worm gear portion 611 of the transmission member 61 cooperate to generate a large torque and to prevent movement in a reverse direction. In this way, the extent of compression of the first resilient member 44 is more precisely controlled in comparison to the above-mentioned conventional relay valve, thereby improving precision in controlling the amount of pressurized air flow between the operating space 34 and the air guiding space 35 (i.e., controlling the amount of pressurized air outputting from the air brake relay valve to the brake chambers 92), enhancing operating time precision, and shortening response time of the air brake relay valve to result in a faster brake response.

In addition, when the motor 51 is not operated to rotate, the worm shaft 52 and the worm gear portion 611 of the transmission member 61 are meshed and are restricted from movement relative to each other, thereby preventing undesired movement of the transmission member 61 by an external force, and providing energy saving advantage since additional electrical control input is not required to prevent undesired movement of the transmission member 61.

Figure 11:
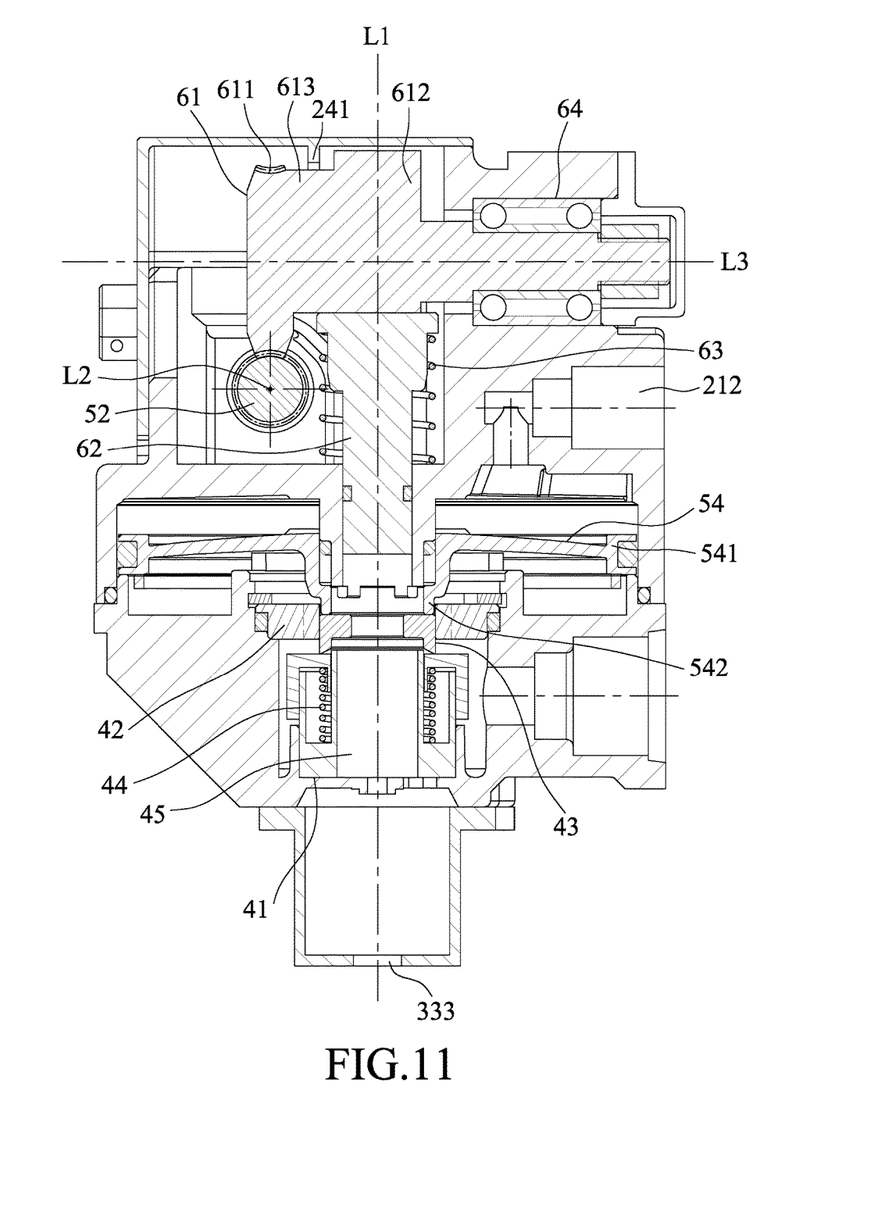
FIG. 11 is a sectional view illustrating the movable set being pushed by the diaphragm to reach the communicating position.

Referring to FIGS. 7, 10, and 11, when the brake pedal 93 is stepped on for generating a brake action and when the movable set 43 is at the non-communicating position, the pressurized air from the pressurized air supply 91 can be controlled to be delivered through the normally open solenoid valve 94 to the fourth valve opening 212 and flow downward through the diaphragm 54, so that the inner push portion 542 of the diaphragm 54 is deformed and pushes the movable set 43 to move to the communicating position. After the brake pedal 93 is released and the pressurized air from the fourth valve opening 212 is discharged, the diaphragm 54 will return to its original non-deformed state to thereby permit the movable set 43 to move back to the non-communicating position by the biasing force of the first resilient spring 44. When the inner push portion 542 is separated from the movable set 43 (i.e., in the original non-deformed state), excess pressurized air is discharged through the exhaust channel 45 and out of the third valve opening 333.

Referring to FIGS. 4, 5, and 10, in a situation where the motor 51 is malfunctioned and the abutment portion 613 of the transmission member 61 does not abut against the abutment piece 241, once the brake pedal is stepped on, the pressurized air from the pressurized air supply 91 can be controlled via the control unit to flow through the normally close solenoid valve 95 into the fifth valve opening 211 to rotate the blade set 53 (under the condition that the plug member 25 is removed), so that the worm shaft 52 is rotated by the rotation of the blade set 53 to drive rotation of the transmission member 61 until the abutment portion 613 abuts against the abutment piece 241. As such, the cam portion 612 of the transmission member 61 is moved away from the driven member 62, and the pressurized air can be delivered to the fourth valve opening 212 to push the diaphragm 54 downward to move the movable set 43 to the communicating position. That is, the diaphragm 54 serves as a back-up driving source when the motor 51 malfunctions. It is worth mentioning that instead of using the pressurized air from the fifth valve opening 211 to rotate the blade set 53, a tool (not shown) can be used to manually rotate the blade set 53 to achieve the same purpose.

Referring to FIGS. 7, 10, and 11, the air brake relay valve of the disclosure can replace traditional quick release valve or conventional relay valve to generate brake action of front or rear wheels of a vehicle. In addition, the air brake relay valve can be employed in brake systems of different types of transport vehicles. When the air brake relay valve is employed in a part of a vehicle that requires fast response, operation of the air brake relay valve can be configured to be driven by the motor 51. When the air brake relay valve is employed in a part of a vehicle that does not require fast response, operation of the air brake relay valve can be configured to be driven by movement of the diaphragm 54. When the motor 51 serves as the main driving source with the diaphragm 54 as the back-up driving source, the air brake relay valve can be used in an electronic controlled brake system (ECBS or EBS). When the diaphragm 54 serves as the main driving source with the motor 51 as the back-up driving source, the air brake relay valve can be used in an autonomous emergency braking (AEB) system.

It should be noted that the air brake relay valve of the disclosure can be applied not only to vehicle braking systems, but also to applications that involve spring-loaded pressure control valves to achieve automated control and to have the flexibility of being pneumatically and/or electrically driven. It is worth noting that the motor 51 can serve as either the main driving source or the back-up driving source, and so as the diaphragm 54.

In summary, by virtue of the operations of and transmission between the motor 51, the worm shaft 52, the transmission member 61, the driven member 62, the ring plate member 42 and the movable set 43, the movable set 43 is driven by the motor 51 to move between the communicating and non-communicating positions in a direct manner, thereby improving precision control of the amount of the pressurized air flow between the operating space 34 and the air guiding space 35, and decreasing the operating time and response time of the air brake relay valve. In addition, in case the motor 51 is malfunctioned, the blade set 53 and the diaphragm 54 can be operated for generating a brake action.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:
1. An air brake relay valve comprising:
a top housing unit defining an upper accommodating space and a lower accommodating space that are spaced apart along a first axis which extends in an up-down direction;
a bottom housing unit defining an operating space that opens upward, and an air guiding space that opens toward said lower accommodating space and that fluidly communicates with said operating space, said bottom housing unit being formed with a first valve opening that fluidly communicates with said operating space and that is adapted to be connected to a pressurized air supply, and at least one second valve opening that fluidly communicates with said air guiding space and that is adapted to be connected to at least one brake chamber;
an air guide unit including
a base seat that is disposed in said operating space, and that has a base portion and a protruding portion protruding upward from said base portion,
a ring plate member that is disposed in said operating space above said base seat and that is formed with an extension hole,
a movable set that is disposed on said base seat, that is movable along the first axis, and that has an extension portion having an outer contour smaller than said extension hole for insertion into said extension hole, and a seal portion connected to a bottom end of said extension portion, sleeved on said protruding portion of said base seat, and having an outer contour larger than said extension hole, and a first resilient member that is connected between said base portion of said base seat and said seal portion of said movable set so as to bias said seal portion away from said base portion, wherein said movable set is movable between a communicating position, where said movable set is pushed so that said seal portion of said movable set is spaced apart from said ring plate member against a biasing force of said first resilient member, and so that a portion of said operating space which is adjacent to said first valve opening fluidly communicates with another portion of said operating space which is adjacent to said air guiding space through said extension hole to thereby permit fluid communication between said first and second valve openings, and a non-communicating position, where said movable set is biased by said first resilient member so that said seal portion sealingly contacts said ring plate member and cooperates with said extension portion to sealingly cover said extension hole, and so that said portion of said operating space which is adjacent to said first valve opening is isolated from said another portion of said operating space which is adjacent to said air guiding space to thereby prevent fluid communication between said first and second valve openings;

a drive unit including a worm shaft that extends along a second axis transverse to the up-down direction and that extends into said upper accommodating space, and a motor that is for driving said worm shaft to rotate about the second axis; and a cam unit including
a transmission member that has a worm gear portion meshing with said worm shaft and driven by said worm shaft to rotate about a third axis which is transverse to the first and second axes, and a cam portion co-rotatable with said worm gear portion,
a driven member that is movable along the first axis, that has a cam follower portion disposed under and in contact with said cam portion of said transmission member, and a stem portion extending downward from said cam follower portion toward said extension portion of said movable set for pushing the extension portion downward; and
a second resilient member that is disposed on said driven member to bias said cam follower portion toward said transmission member;

wherein, during a brake action, said motor rotates by a predetermined angle to rotate said worm shaft to drive rotation of said transmission member, so that said cam portion of said transmission member is rotated to push said driven member downward to thereby push said movable set to move to the communicating position; and wherein, when the brake action is released, said motor rotates reversely by the predetermined angle to move said cam portion of said transmission member away from said driven member, so that said driven member is moved upward by a biasing force of said second resilient member away from said movable set and that said movable set returns to the non-communicating position without being applied with additional force.

2. The air brake relay valve as claimed in claim 1, wherein:
said top housing unit includes
a top surrounding wall which surrounds the first axis and on which said motor is disposed,
a tubular wall which surrounds the first axis, which is surrounded by said top surrounding wall, and through which said stem portion of said driven member movably extends, and
a top connecting wall which interconnects said top surrounding wall and said tubular wall;
said top surrounding wall, said tubular wall, and said top connecting wall cooperatively define said upper and lower accommodating spaces;
said bottom housing unit includes a bottom surrounding wall that is located under said top surrounding wall, an inner surrounding wall that is surrounded by said bottom surrounding wall and that defines said operating space, and a bottom connecting wall that interconnects said bottom surrounding wall and said inner surrounding wall, and that is formed with said first and second valve openings;
said bottom surrounding wall, said inner surrounding wall, and said bottom connecting wall cooperatively define said air guiding space; and
said second resilient member has two ends respectively urge against said cam follower portion of said driven member and said top surrounding wall so as to bias said cam follower portion away from said top surrounding wall.

3. The air brake relay valve as claimed in claim 2, wherein:
said top surrounding wall and said top connecting wall cooperatively define a separated space that is spaced apart from said upper accommodating space along the second axis;
said worm shaft extends into said separated space;
said top surrounding wall is formed with a fifth valve opening that fluidly communicates with said separated space; and
said drive unit further includes a blade set that is disposed in said separated space to correspond in position to said fifth valve opening, and that is co-rotatably coupled to said worm shaft.

4. The air brake relay valve as claimed in claim 3, wherein said top housing unit further includes a cover that is disposed on said top surrounding wall to cover said upper accommodating space and said separated space, and a plug member that removably plugs into a part of said cover which corresponds in position to said separated space.

5. The air brake relay valve as claimed in claim 3, wherein:
said top surrounding wall is further formed with a fourth valve opening that fluidly communicates with said lower accommodating space; and
said drive unit further includes a diaphragm that is disposed in said lower accommodating space, that is sleeved on said tubular wall, and that is connected to said top surrounding wall, said diaphragm having an outer fixed portion connected to an inner periphery of said top surrounding wall, and an inner push portion that is slidable along said tubular wall, and that is operable to push said movable set downward so as to move said movable set to the communicating position.

6. The air brake relay valve as claimed in claim 2, wherein:
said top surrounding wall is further formed with a fourth valve opening that fluidly communicates with said lower accommodating space; and said drive unit further includes a diaphragm that is disposed in said lower accommodating space, that is sleeved on said tubular wall, and that is connected to said top surrounding wall, said diaphragm having an outer fixed portion connected to an inner periphery of said top surrounding wall, and an inner push portion that is slidable along said tubular wall, and that is operable to push said movable set downward so as to move said movable set to the communicating position.

\* \* \* \* \*